March 5, 1935.  E. D. LILJA  1,992,956
SHADING RING INDUCTION MOTOR
Filed Oct. 27, 1932
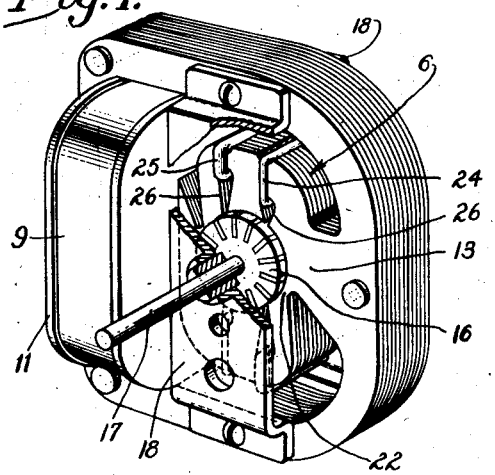
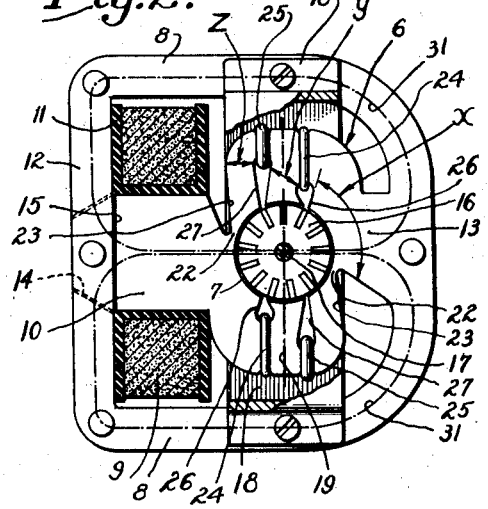
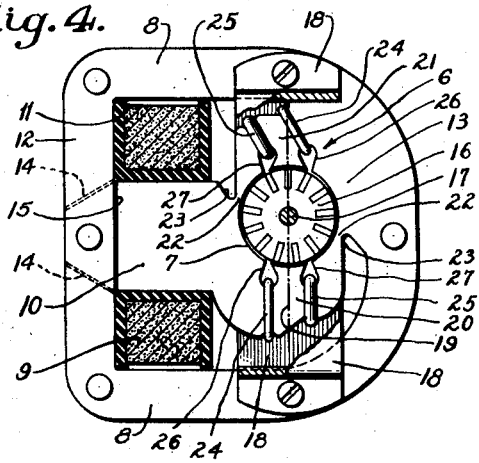
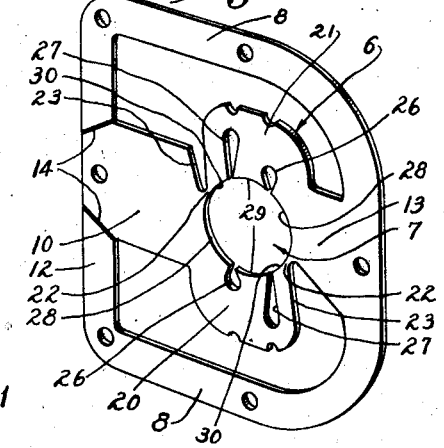
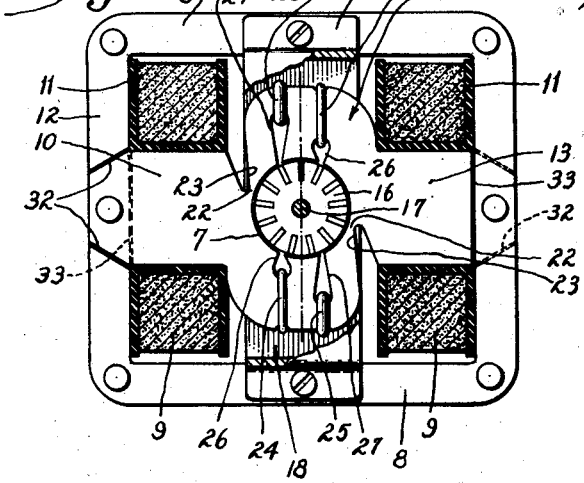
INVENTOR
Edgar D. Lilja
BY
ATTORNEYS Patented Mar. 5, 1935

1,992,956

UNITED STATES PATENT OFFICE 1,992,956

SHADING RING INDUCTION MOTOR

Edgar D. Lilja, Rockford, Ill., assignor to Howard D. Colman, Rockford, Ill.

Application October 27, 1932, Serial No. 639,760

14 Claims. (Cl. 172—278)

This invention relates to shading ring induction motors and more particularly to those having stators of the so called shell type in which the iron of the field member encloses the exciting winding and provides at least two available magnetic circuits for the flux set up by excitation of the winding.

In motors of the above class heretofore constructed, the shading ring for each pole is mounted on the magnetic core of the exciting winding closely adjacent the latter. In this position, the ring is closely coupled magnetically with the winding so as to cause transformer and short circuit losses of such magnitude as to impair materially the efficiency of the motor and to prevent the use of shading rings having electrical characteristics which will produce optimum performance.

The primary object of the invention is to overcome the defect in prior shell type motors by a novel construction of the motor poles and arrangement of the shading rings thereon remote from the exciting winding.

The invention also resides in the novel manner of defining the desired spaced relation of the motor poles and the differently shaded face areas thereof.

Other objects and advantages of the invention will become apparent from the following detailed description taken in connection with the accompanying drawing, in which Figure 1 is a perspective view of a motor embodying the features of the present invention, a portion of the bearing frame being broken away.

Fig. 2 is an elevational view with the field winding shown in section.

Fig. 3 is a perspective view of one of the stator laminations.

Figs. 4 and 5 are views similar to Fig. 2 showing modified forms of the motor.

The motors shown in the drawing by way of illustration are of the two pole type, each having a laminated stator preferably comprising an integral elongated magnetic member designated generally by the numeral 6 and constituting the rotor leg and also the winding leg of the stator. Near its center the member is formed with a cylindrical rotor recess 7 and its opposite ends are magnetically joined by somewhat narrower legs 8 each spaced from the member 6 and cooperating therewith to form a magnetic circuit around one or more main field windings 9 encircling the member. In the forms shown in Figs. 1 to 4, the end 10 of the member 6 forms the core for the winding 9 which is carried by a spool 11 abutting at one end against right angle portions 12 of the legs 8. For the sake of compactness where only one exciting winding is employed, the opposite ends of the legs may be curved toward the end 13 of the member 6 which latter end may be relatively shorter than the core 10 and need not be formed with parallel sides.

To permit each lamination to be formed in one integral piece and allow for convenient assembly of the same and the winding 9, each lamination is severed at the end of the core 10 to permit the member 6 as a whole to be flexed away from the legs 12 and the core to be inserted through the spool. The required degree of flexing is permitted in view of the length of the member 6. If desired, a lap joint may be formed by severing the laminations alternately along lines 14 and 15.

A rotor 16 of the squirrel cage type is mounted in the recess 7 with its shaft 17 journaled at opposite ends in bearing plates 18 rigidly secured at opposite ends to the assembled stator.

In order that the shading rings by which the magnetic field is caused to rotate around the rotor recess may be located remotely from and out of closely coupled relation to the winding 9 as contemplated by the present invention, the magnetic poles are constructed to permit location of the shading rings in positions spaced substantial distances around the rotor from the positions normally occupied by the rings in shell type motors. To this end, the iron portion of the member 6 between the winding 9 and the rotor forms only a part of the unshaded portion of one pole, the center of the shaded portion being shifted around the rotor and disposed beyond a diameter 19 of the rotor perpendicular to the axis of the winding 9. This arrangement is attained by bulging the intermediate portion of the member 6 outwardly in opposite directions from the ends 10 and 13 forming laterally offset extensions 20 and 21 of these ends each projecting around the rotor to a point adjacent the opposite end 10 or 13 of the member 6. The extensions 20 and 21 are of substantial radial width and at their ends preferably taper to narrow magnetic restrictions 22 formed by inwardly converging notches 23 extending laterally into the member 6 toward the rotor recess.

It will be apparent that the end 10 and the extension 20 thereof and the end 13 and the extension 21 thereof constitute two pole projections with substantially alined ends on opposite sides of the rotor and inner ends extending beyond each other in laterally offset relation with the rotor between them, each extension being integrally connected to the other by one of the restrictions 22. The rotor surface is thus completely enclosed by two substantially continuous faces disposed on opposite sides of a diameter of the rotor through the restrictions 22.

While only one shading ring need be employed on each pole, two rings numbered 24 and 25 are used herein both being mounted on the extensions 20 and 21 adjacent the diameter 19 and therefore are disposed remotely from the winding 9 and the ends 10 and 13 of the member 6. In the present instance, the larger rings 24 are disposed between the diameter 19 and the ends 10 and 13 and extend through short slots 26 in the extensions 20 and 21 adjacent and opening into the rotor recess. The smaller rings are disposed on the opposite side of the diameter 19 extending through relatively longer slots 27 in the case of the motor shown in Fig. 2.

From the foregoing it will be apparent that the iron of each pole is divided into an unshaded section $x$, a section $y$ shaded by the ring 24, and a section $z$ shaded by both rings, each pole face being divided by the slots 26 and 27 into unshaded, single shaded, and double shaded areas 28, 29 and 30.

The relative sizes of the differently shaded areas are determined by the location of the slots 26 and 27 and the relative sizes of the single and double shaded iron sections $y$ and $z$ are determined by the spacing of the slots. With the pole projections constructed and the shading rings arranged thereon as above described, it will be apparent that the correspondingly shaded areas of the two poles are of the same size and are diametrically opposite each other and are thus adapted to produce proper space displacement of the rotating field components. Proper phase displacement between the field components threading each pole is obtained through the use of shading rings of suitable low resistance.

The winding 9 is designed to cause substantial saturation of the stator iron when excited by alternating current. The major portion of the flux thus set up threads the rotor, the unshaded pole sections 28, and the legs 8 along paths indicated by dotted lines 31 (Fig. 2). A portion of the flux diverted around the extensions 20 and 21 threads the rings 24 causing currents to be induced in the latter, which currents set up a magnetic field reacting with the main field to produce a lagging of the resultant flux which threads the rotor from the sections $y$. Owing to the location of these sections which are defined by the slots 26 and 27, this lagging flux enters the rotor substantially at right angles to the axis of the winding 9. In a similar way, currents are induced in the rings 25 by the flux threading the latter with the result that the flux threading the pole sections $z$ between the notches 23 and the slots 27 is displaced in time phase still farther from the unshaded flux. The magnetic field thus shifts progressively across the pole faces.

In the arrangement above described, it will be apparent that the shading rings of the poles are spaced substantially equidistant from the winding 9, the core 10 thereof, and the end portion 13, and are thus disposed as remotely from these parts as is possible while at the same time maintaining proper spaced relation of the differently shaded areas of the poles. The rings, when thus located, are not closely coupled with the winding 9 with the result that the transformer and short circuit losses are reduced to a minimum. Accordingly the efficiency of the motor is materially increased and the shading rings may be formed of the low resistance which is necessary in order to produce a magnetic field of maximum effectiveness.

It will be apparent from the foregoing that the pole projections may take various shapes. As shown for example in Fig. 4, the taper of the projections 20 and 21 may extend substantially throughout their lengths and the slots 26 and 27 made of the same length.

Fig. 5 shows a modification of the motor in which two windings 9 are employed, the second one having a core formed by the end 13 of the magnetic member. To permit assembly of the laminations when two windings are used, the stator is formed in two pieces, the member 6 constituting one of these, the other being formed by the rectangle composed of the legs 8, 12 and 34 and magnetically connecting opposite ends of the member 6 externally of the windings 9. To form lap joints at opposite ends of the member 6, the alternate laminations are severed along lines 32 and 33.

I claim as my invention:

1. A motor of the character described combining an integral elongated member with magnetically connected opposite ends and forming two pole pieces with faces defining a cylindrical rotor recess formed intermediate the ends of the member, a rotor in said recess, a field winding enclosing one end of said member, a notch extending laterally into said member between said winding and said rotor, said notch converging inwardly and terminating adjacent but short of said recess, a similar notch in said member diametrically opposite said first notch and cooperating therewith to define said pole pieces, a shading coil enclosing a section of one of said pole pieces and disposed approximately midway between said winding and the notch at the opposite end of said member, and a shading coil on said other pole piece diametrically opposite said rotor from said first mentioned shading coil.

2. A motor of the character described combining an elongated magnetic member having a cylindrical recess therein intermediate its ends and inwardly converging lateral notches on opposite sides thereof terminating adjacent but short of said recess whereby to define two magnetic pole pieces disposed on diametrically opposite sides of said recess with adjacent side tips integrally connected at the roots of said notches, a field winding enclosing one end of said member, two magnetic connections joining opposite ends of said member and enclosing said winding, a rotor rotatable in said recess, and two shading rings, one on each of said pole pieces disposed substantially diametrically opposite each other and substantially equidistant from the ends of said member.

3. A motor of the character described combining a rotor, two magnetic members extending toward said rotor with their adjacent ends laterally offset and each extending around the rotor to a point adjacent the other member, the pole pieces formed by said members being defined by notches converging inwardly toward the rotor and disposed between one member and the inner end of the other member, a field winding enclosing the outer end of one of said members, shading coils on said offset ends, and magnetic connections joining the outer ends of said members externally of said winding.

4. A motor of the character described combining a cylindrical rotor, a magnetic member having a straight sided portion at one end extending toward said rotor and a curved sided portion at the other end defining a pole face partially enclosing the periphery of said rotor, a field winding enclosing said straight sided portion, a shading ring enclosing said curved sided portion and spaced from said winding whereby to shade the side portion of said face remote from the winding, a second member providing a pole face on the side of said rotor opposite said first mentioned face, a short-circuited ring on the latter member shading a corresponding side portion of the latter face, and magnetic connections joining the outer ends of said members.

5. A motor of the character described combining a rotor, a field winding arranged with its axis extending toward said rotor, two polar members extending toward said rotor from opposite sides thereof and one constituting the core of said winding, the inner adjacent ends of said members following around the rotor surfaces and defining pole faces extending beyond a diameter of the rotor parallel to said winding, shading means on said inner ends spaced from said winding and acting to cause lagging flux to enter the rotor from each pole face beyond said diameter, and magnetic connections extending around said winding and joining the outermost ends of said members.

6. A motor of the character described combining a rotor, two magnetic members extending toward the rotor on opposite sides thereof with their inner adjacent ends laterally offset with respect to each other and extending around the rotor surface, a field winding on one of said members, shading coils enclosing sections of said inner ends and disposed on opposite sides of the rotor adjacent a diameter perpendicular to the axis of said winding, and means magnetically joining the outermost ends of said members and extending around said winding.

7. A motor of the character described combining a rotor, a field winding arranged with its axis extending toward said rotor, an elongated magnetic member providing a core for said winding and also two pole pieces having faces substantially enclosing and disposed on opposite sides of said rotor, short-circuited coils spaced remotely from said winding and core and positioned to cause lagging flux to thread the rotor from portions of said faces disposed opposite each other substantially along a diameter perpendicular to the axis of said winding, the portions of said faces along a diameter generally parallel to said axis being unshaded, and means magnetically connecting opposite ends of said member and enclosing said winding.

8. A motor of the character described combining a rotor, a field winding, a magnetic core for said winding projecting toward said rotor and forming an unshaded pole face area, a laterally offset magnetic extension integral with said core and extending partially around said rotor from said core to form a continuation of said area, a shading ring on said extension and acting to cause a lagging of the flux entering a portion of the rotor periphery, the major portion of such lagging flux entering the rotor beyond a diameter of the rotor perpendicular to the axis of said winding, a magnetic polar projection with a shading ring thereon providing unshaded and shaded face areas diametrically opposite the corresponding areas of said first mentioned face, and means magnetically connecting said core and projection externally of said winding and said extension.

9. A motor of the character described combining a rotor, a field winding, a magnetic core for said winding projecting toward said rotor and forming an unshaded pole face area, a laterally offset magnetic extension integral with said core and extending partially around said rotor from said core to form a continuation of said area, a short-circuited coil projecting through said extension and defining a shaded portion of said face area, the center of said portion being located beyond a diameter of the rotor perpendicular to the longitudinal axis of said core, a magnetic polar projection with a shading ring thereon providing unshaded and shaded face areas diametrically opposite the corresponding areas of said first mentioned face, and means magnetically connecting said core and projection externally of said winding and said extension.

10. A motor of the character described combining a rotor, two magnetic members disposed on opposite sides of said rotor and having laterally offset inner ends each extending around said rotor to a point adjacent the other member, a field winding around one of said members, shading coils on said inner ends spaced from said winding and acting to cause lagging flux to enter the rotor from the faces beyond the coils, and means magnetically joining the outermost ends of said members externally of said winding.

11. A motor of the character described combining a rotor, a pair of field windings arranged on opposite sides of said rotor with their axes extending in the same general direction, two magnetic members having their outermost ends enclosed by said windings and their adjacent ends bulging outwardly around said rotor between said windings, there being a magnetic restriction at the innermost end of each member adjacent the winding of the other member, shading rings near said inner ends located approximately midway between said windings and acting to cause a lagging flux to enter the rotor from each member over the area between its ring and the adjacent restriction, and means magnetically joining said members externally of said windings.

12. For a motor of the character described, a single piece stator lamination comprising a member of generally rectangular shape and a cross-member integral at one end with one side of the rectangle and having its other end disposed adjacent but severed from the opposite side of the rectangle to permit flexing of said cross-member and insertion thereof through a field winding, the intermediate portion of said cross member providing two pole pieces defining a rotor recess and having opposite side tips integrally joined by connections of narrow radial width.

13. A motor of the character described comprising, in combination, a rotor, a plurality of pole pieces projecting toward said rotor in annularly spaced relation and each having one side terminating closely adjacent said rotor and an opposite side portion of substantial width extending around the rotor surface closely adjacent thereto and finally tapering relatively sharply toward the rotor adjacent the first mentioned side of the adjacent pole piece, a field winding enclosing at least one of said pole pieces, shading coils one on each of said extended side portions disposed remotely from and out of closely coupled magnetic relation with respect to said winding whereby to form shaded pole face areas at the innermost end portions of said extended side portions, and means magnetically connecting the remote ends of said pole pieces.

14. A motor of the character described comprising, in combination, a rotor, a plurality of magnetic members projecting toward said rotor and having one side portion closely following the rotor contour and extending around the same toward the other side portion of an adjacent member, a field winding enclosing one of said members, a shading ring for each member enclosing said extended side portion, each shading ring being disposed remotely from and out of closely coupled relation with respect to said winding and defining for each member a shaded pole face area the major portion of which is disposed beyond the median plane between one member and the unshaded side of the adjacent member, and means magnetically connecting the remote ends of said members.

EDGAR D. LILJA.